United States Patent

[11] 3,593,318

| [72] | Inventor | Iben Browning |
| | | 745 Distel Drive, Las Altas, Calif. 94022 |
| [21] | Appl. No. | 708,061 |
| [22] | Filed | Feb. 26, 1968 |
| [45] | Patented | July 13, 1971 |

[54] OPTICAL MEMORY
2 Claims, 5 Drawing Figs.

[52] U.S. Cl. ............... 340/173L, 340/173.2
[51] Int. Cl. ............... G11c 11/22, G11c 11/42
[50] Field of Search............ 340/173

[56] References Cited
UNITED STATES PATENTS

| 2,909,973 | 10/1959 | Koelsch et al. | 340/173 X |
| 3,027,806 | 4/1962 | Koelsch et al. | 340/173 X |
| 3,449,038 | 6/1969 | Scarrott | 340/173.2 X |

FOREIGN PATENTS

| 933,567 | 8/1963 | Great Britain | 340/173 |

OTHER REFERENCES

Richard D. Steward, " Storing Data with Light," ELECTRONICS, Feb. 21, 1966, pp. 82— 86.

*Primary Examiner*—Terrell W. Fears
*Attorney*—Limbach, Limbach, and Sutton

ABSTRACT: An optically interrogated information storage and retrieval device is disclosed wherein light is modulated by a light shutter array comprising a polycrystalline ferroelectric ceramic lattice and focused on a photographic film to produce an image corresponding to the configuration of light-transmitting portions of the ceramic lattice. A lens mosaic may be used to focus light transmitted by the ferroelectric ceramic lattice to a plurality of nonoverlapping regions of the photographic film to produce in combination extremely high information bit density. A laser beam may be used for the light source and an energy-absorbing coating for the information storage medium to provide a high density mass memory.

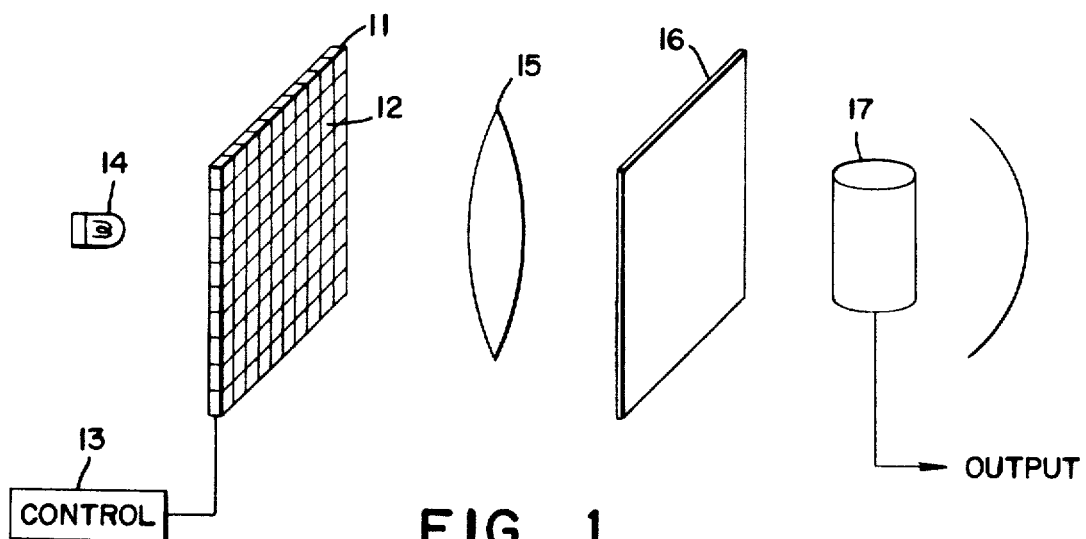
FIG_1
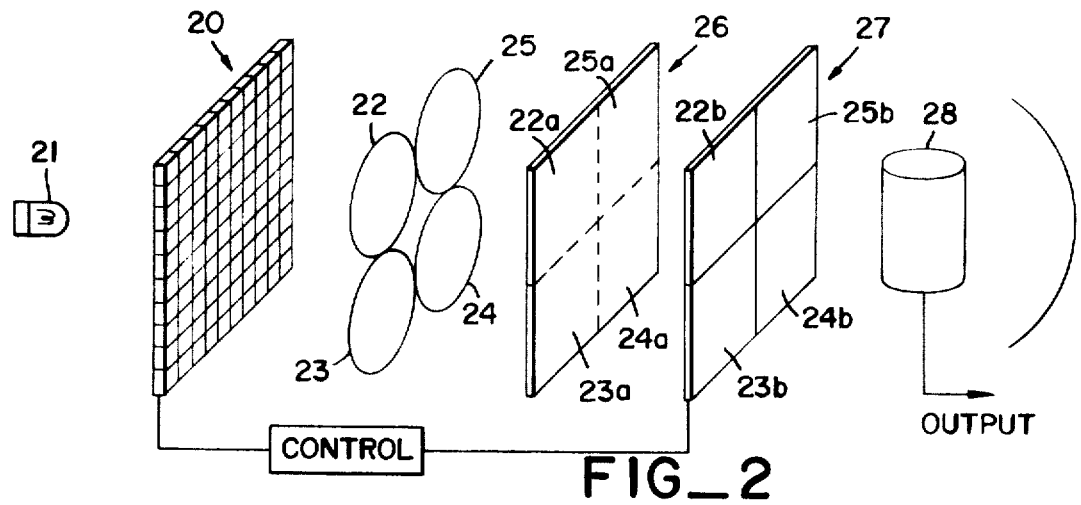
FIG_2
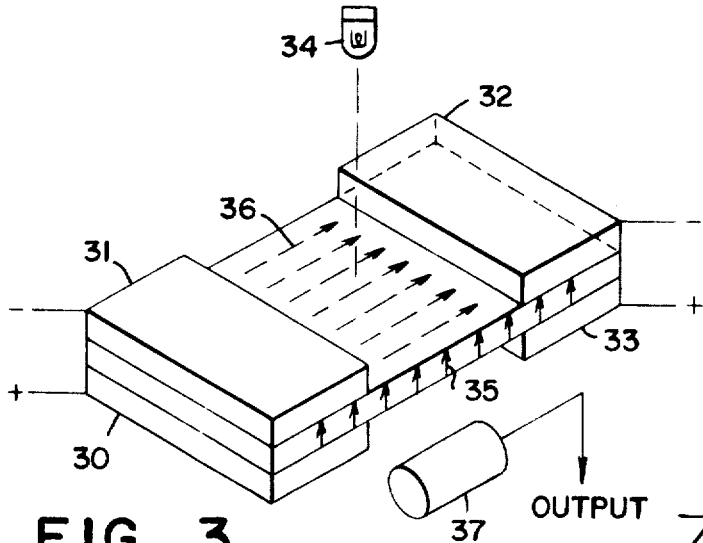
FIG_3
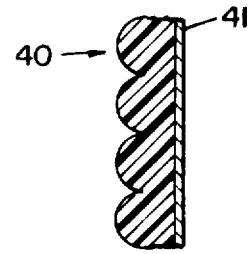
FIG_4
INVENTOR.
IBEN BROWNING
BY
Townsend and Townsend
ATTORNEYS

OPTICAL MEMORY

This invention relates to a new and improved optically interrogated information storage and retrieval device.

Certain polycrystalline ferroelectric ceramics have been developed having a light transmissivity which varies depending upon the polarization state of the ceramic. Thus, coarse grained (over 2 microns) polycrystalline hot-pressed lead zirconate-lead titanate ceramics when polarized normal to the major surface to which light is incident are substantially transparent. On the other hand, when polarized parallel to the major surface to which light is incident they are substantially opaque. The transmissivity state persists after removal of the polarizing field thereby providing a binary optical memory or an electrically controlled high-speed shutter device.

The same ceramics when formed in a fine grained polycrystalline form, on the other hand, provide a continuous range of transmissivity to plane polarized light depending upon the angle between the direction of polarization of the light and the direction of polarization of the ceramic. The fine grained polycrystalline ceramic thus may be used as a multistate memory or as a continuous range light filter.

Polarization of such a polycrystalline ferroelectric ceramic plate by externally applied electric fields may be highly localized. Thus, a lattice comprising the ceramic material and electrodes may be formed to thereby provide an electrically controlled high-speed shutter array or an electrically controlled high-speed continuous range light filter array.

It is an object of the present invention to utilize the anisotropic optical response of certain polarized ferroelectric ceramics to provide an electrically controlled high-speed ceramic lattice shutter array to modulate light with information to be stored in a photographic emulsion or energy-absorbing coating.

Another object of the invention is to utilize a lens mosaic in combination with the ceramic lattice to provide extremely high information bit density.

In order to accomplish these results, the present invention contemplates the provision of a ceramic lattice comprised of a plate of hot-pressed lead zirconate-lead titanate or other ceramic with similar properties and a plurality of electrodes for selective polarization of localized portions of the plate to thereby provide a high-speed electrically controlled shutter array. Light from a source spaced from the ceramic lattice and transmitted therethrough is focused by a lens system onto a photographic emulsion to thereby form an image of the configuration of light-transmitting portions of the ceramic lattice. The portion of the image corresponding to each shutter constitutes one information bit.

In order to provide extremely high information bit density, another aspect of the invention contemplates providing a lens mosaic for the lens system spaced from the first ceramic lattice, and a photographic film or energy absorbing coating positioned in the focal plane of the lenses comprising the lens mosaic. The lens mosaic forms a plurality of images of the configuration of light-transmitting shutters of the first ceramic lattice on selected portions of the film or energy absorbing coating which is then developed. The shutters of a second ceramic lattice shutter array positioned on the other side of the exposed film or energy absorbing coating may be opened or closed to select any one of the plurality of images of the first ceramic lattice formed by the lenses of the lens mosaic. Light transmitted through the image selected by the second ceramic lattice shutter array is transmitted to a photocell or photomultiplier for readout of the stored information. The combination of information bits provided by the first and second ceramic lattices and lens mosaic provides extremely high density information storage and retrieval from the photographic emulsion or energy absorbing coating.

The invention also contemplates utilizing an energy-absorbing coating for the information storage medium and a laser beam as the light source to produce an inexpensive mass memory.

Other objects, features and advantages of the present invention will become apparent in the following specification and accompanying drawing.

FIG. 1 is a diagrammatic perspective view of one form of optical train embodying the present invention;

FIG. 2 is a diagrammatic perspective view of another form of optical train embodying the present invention;

FIG. 3 is a diagrammatic perspective view of one shutter portion of the ceramic lattice;

FIG. 4 is a fragmentary cross-sectional view of a lens mosaic and adhered photographic film emulsion for energy-absorbing coating.

Figure 5:
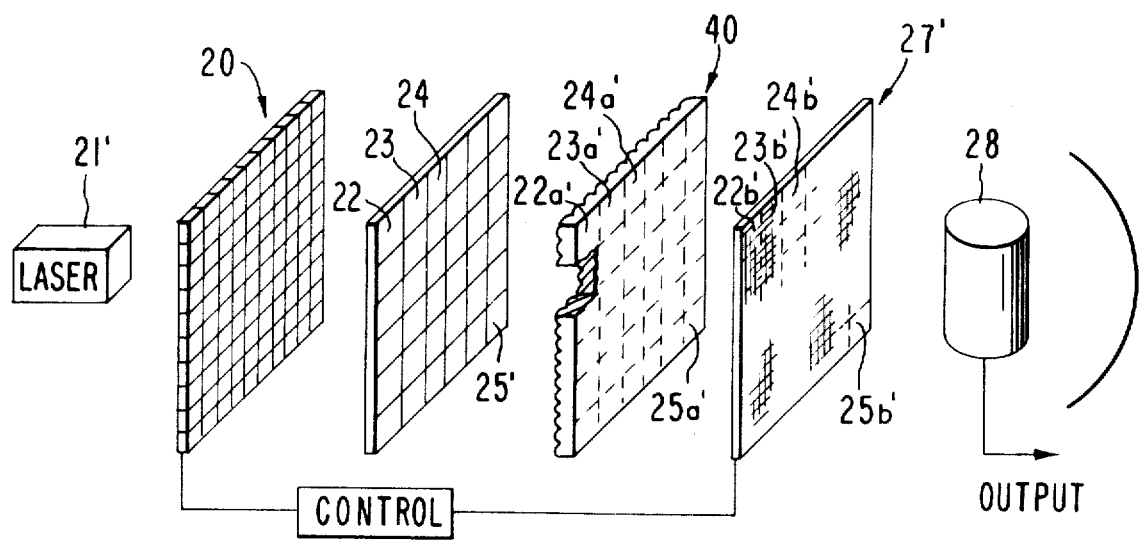
FIG. 5 is a view similar to FIG. 2 incorporating structure of FIG. 4.

In the embodiment of the present invention illustrated in FIG. 1, there is generally provided a ceramic lattice 11 comprised of a polycrystalline ferroelectric ceramic having an anisotropic optical response when polarized and a plurality of electrodes for externally applying electric switching fields. Each set of electrodes controls the polarization of a highly localized region 12 of the ceramic lattice to thereby provide an electrically controlled high-speed shutter array to thereby transmit light through the ceramic lattice in a configuration determined by the control means 13 which is connected to the electrodes.

A light source 14 positioned on one side of the ceramic lattice produces light transmitted through the ceramic lattice according to the predetermined configuration of the shutters in the ceramic lattice 11 set by control means 13. The light is focused by lens 15 spaced from the lattice to form an image of the ceramic lattice on a photographic film or energy absorbing medium 16 positioned in the image plane of lens 15.

If the polycrystalline ferroelectric ceramic used in the ceramic lattice is coarse grained (over 2 microns), each localized portion of the ceramic lattice controlled by a set of electrodes will act as a binary shutter, and the binary information stored in the array of open and closed shutters will be stored on the photographic film or energy absorbing medium 16. If a positive development transparency is used, open shutters will be recorded as transparent images and closed shutters as opaque images.

In order to read out the information stored in the photographic emulsion or plate 16, a photomultiplier tube 17 or other similar photoresponsive transducer may be spaced from the information storage photograph or medium 16 as shown in FIG. 1. Light passed through a shutter 12 and focused by lens 15 on the information storage photographic transparency or medium 16 will produce a response at the output of the photomultiplier tube 17 if the information bit corresponding to a particular shutter 12 has a transparent value on the information storage photographic emulsion or medium 16. Since light from any other shutter in the ceramic lattice would be focused elsewhere on the photographic emulsion or medium, only if the image region on the photograph or medium 16 corresponding to a particular shutter of the ceramic lattice is transparent, will light pass through to the photomultiplier tube and register a signal at the output. Thus, a square ceramic lattice comprised of 100 shutter portions along each dimension would be capable of recording 10,000 binary bits of data on the photographic transparency 16.

As illustrated in FIG. 3, each localized shutter portion of the ceramic lattice is provided with a set of electrodes 30, 31, 32 and 33, or some similar configuration to provide an external polarizing electric field either normal to or parallel to the major surface to which light from the source 34 is incident. Thus, with the electrodes biased as indicated in FIG. 3, polarization of the ceramic material occurs in the direction normal to the major surface to which light is incident, indicated by the solid arrows 35 and the ceramic material is substantially transparent to incident light from the source 34. With the electrodes 30 and 31 biased positively and the electrodes 32 and 33 biased negatively, polarization would occur in the direction indicated by the dotted arrows 36 parallel to the major surface to which light is incident so that the ceramic material would be substantially opaque to the incident light. Photomultiplier tube 37 would thus produce a signal at the output only when the ceramic material was polarized as indicated by the solid arrows 35. The electrode configuration shown in FIG. 3 is particularly suited for coarse grained (over 2 microns) polycrystalline ferroelectric ceramic material which acts as a binary shutter. Other electrode configurations are known in the art and need not be described here.

In the embodiment of the invention illustrated in FIG. 2, binary bit information storage density is greatly increased. In the embodiment of the invention illustrated in FIG. 2, there is provided a first square ceramic lattice 20 having, for example, 100 separately controlled shutter portions along each dimension thereby providing a shutter array of 10,000 binary shutters. Light from source 21 transmitted through the ceramic lattice 20 is focused by a lens system of four lenses 22—25 onto a photographic film or energy absorbing coating 26 comprised of four exposure portions 22a—25a corresponding to each of the lenses 22—25, respectively, comprising the lens system. Each of the lenses forms an image of the first ceramic lattice 20 on only one of the four portions of the film or energy absorbing material 26. A different configuration of open shutters in the ceramic lattice shutter array is exposed on each of the exposure portions 22a—25a by masking as by shutters 22'—25' all of the lenses but one during exposure of the different shutter arrays.

For readout of stored information stored in the film or energy absorbing medium, a second ceramic lattice shutter array 27 is provided having shutter portions 22b—25b corresponding to the exposure portions 22a—25a. Thus, with only shutter 22b open, an image may be formed by lens 22 of bits of information indicated by the ceramic lattice 20 on a corresponding exposed portion 22a of the pre-exposed photographic emulsion or energy absorbing medium 26 which selectively transmits the light to a photomultiplier tube 28. Shutter 22b may then be closed and another shutter 23b opened to match the configuration of binary bit information produced on the first ceramic lattice shutter array 20 with another exposed image portion 23a. A different shutter on the second ceramic lattice 27 may thus be opened to match the image of the binary information bits displayed by the ceramic lattice 20 with each different portion of the exposed photographic emulsion or medium 26. In this manner, the number of information bits formed in the first ceramic lattice and stored in the film or energy absorbing medium is multiplied by the number of exposed image portions on the exposed film or energy absorbing medium and corresponding lenses in the lens system. Readout of stored information is accomplished as heretofore described using a photomultiplier tube 28 or similar photosensitive transducer.

In place of the lens system 22—25, a lens mosaic 40 may be used as illustrated in FIGS. 4 and 5. The lens mosaic is formed as described in my U.S. Pat. No. 3,367,826 issued on Aug. 23, 1966. The lens mosaic is comprised of a multitude of tiny lenses in a closely packed array as shown in the fragmentary cross-sectional view of FIG. 4. The lens mosaic 40 may then be spaced from the first ceramic lattice 20 to form a multitude of images of the 10,000 information bit array on a photographic film or energy absorbing coating positioned in the image plane of the lenses comprising the lens mosaic, in a manner similar to that described in FIG. 2. For readout of information, the second ceramic lattice 27', however, would also be formed of a multitude of localized shutter portions so that a multitude of shutters would be provided, one corresponding to at least one of each of the lenses in the lens mosaic 40.

Exposure of the photographic film or energy absorbing medium 27', positioned in the image plane of the lenses comprising the lens mosaic is accomplished selectively by means of a light mask 22"—25" positioned before the lens mosaic. Thus, light transmitted through each different configuration of open shutters in the ceramic lattice shutter array 20 is passed through a different one or predetermined number of the lenses comprising the lens mosaic 40 by the light mask 22"—25" positioned in front of the lens mosaic 40 to form exposures on different portions of the film or energy absorbing medium 41. The number of lenses of the lens mosaic left uncovered by the light mask during each exposure depends upon the desired redundancy factor in the stored information.

Utilizing a standard 4-inch by 5-inch photographic plate and a 4-inch by 5-inch lens mosaic having 625 lenses per square inch, the lens mosaic would include 12,500 lenses across its area. If the second ceramic lattice were constructed to provide one localized shutter area for each four lenses (a redundancy factor of 4) of the lens mosaic, then 3,125 areas on the photographic plate would be available on each of which would be recorded 10,000 bits of information displayed on the first ceramic lattice 20. Thus, such a configuration would provide a capability of recording and reading out 31,250,000 bits of data per 4-inch by 5-inch photographic plate. Such an information density would require a photographic resolution of approximately 2,600 lines per square inch. Since high resolution photographic material with resolution up to 50,000 lines per inch is available, there is no problem in achieving such information storage density on existing photographic film.

When recording information bits at such a density, the spacing between the first ceramic lattice shutter array and the lens system is not critical, one thirty-second of an inch tolerances being acceptable. The spacing between the lens system and the photoplate is, however, critical. In order to avoid the troublesome tolerances in placement of the lens mosaic and photographic film the lens mosaic may be molded on a transparent plastic of sufficient thickness so that the focal plane of the lenses comprising the lens mosaic falls on the back surface of the lens mosaic. A photographic emulsion 41 may then be adhered directly to the back surface of the lens mosaic 40 as illustrated in FIG. 4.

With the lens mosaic and photographic film locked in a permanent relationship, placement tolerances are avoided. The photograph emulsion is then exposed through the lens mosaic to store the information contained in each configuration of shutters in the first ceramic lattice on a different region of the photographic film adhered directly to the back of the lens mosaic. Exposure of different regions of the film is accomplished as described above utilizing a selective light mask in front of the lens mosaic or by conventional shutters having shutter portions which are either completely transparent or completely opaque also positioned in front of the lens mosaic. A ceramic lattice shutter array may not be used for selectively exposing light from the first ceramic lattice shutter array 20 to different lenses of the lens mosaic because the shutter portions of the ceramic lattice are not completely transparent to light when polarized to the light transmitting state. Rather, the shutter is translucent in the light transmitting polarized state and would obscure and diffuse the image of the first ceramic lattice formed by the lens mosaic.

The mechanical or conventional shutter positioned in front of the lens mosaic would be operated to permit only certain lenses of the lens mosaic to form images of the first ceramic lattice 20 on certain regions of the photographic film or information storage medium. Thus, the variety of combinations and permutations permitting extremely high density information storage would be available as heretofore described.

In order to read out information stored in the photographic emulsion or energy-absorbing coating adhered directly to the back surface of the lens mosaic, the second ceramic lattice shutter array 27 would be positioned directly behind the information storage coating and between the coating and a photosensitive transducer. Thus, light passed through the first ceramic lattice array 20 and focused by the lens mosaic on the pre-exposed photographic emulsion or energy absorbing coating in which information is stored would be selectively transmitted through transparent portions of the information storage medium and the second ceramic lattice shutter mechanism 27 to the photosensitive transducer 28. A lens such as a Fresnel lens may be used to direct light, transmitted through the second ceramic lattice shutter array, onto the photoresponsive transducer. The shutter array 27 following the lens mosaic and information storage medium can then be used to selectively transmit light from certain portions of the information storage medium only, namely the information storage medium sought to be interrogated. The second shutter array 27 might alternatively be an array of conventional shutter mechanisms.

Instead of using a photographic emulsion or film, an energy-absorbing coating on a substrate may be used as the information storage medium. In that case a laser beam would be used as the light source, the ceramic lattice shutter array and lens mosaic selectively transmitting and focusing the laser beam light to selectively burn away the energy-absorbing coating. Such a system would thereby provide an inexpensive mass memory. For example, all the alphanumeric characters can be represented with a six bit digital code. With 31,000,000 bits on a plate, over 5,000,000 characters would be available. Words in English text average five characters, thereby providing approximately 1,000,000 words or 10 average 300-page books on a single 4-inch by 5-inch plate. Thus, one could provide a 10,000 book library in standard card files in an office with little cost and no problem with storage space.

In each of the foregoing devices described herein a coarse grained (over 2 microns) polycrystalline ceramic material in the ceramic lattice would provide a binary shutter array. By utilizing fine grained ceramic material in the first ceramic lattice, and plane polarized light from a light source, a continuously variable light filter array may also be used to provide a multistate memory for storage of higher order information bits. Thus, the ceramic lattice would be comprised of a plurality of continuously variable filters for providing variable transmissivity through the localized filter portions of the lattice to store higher order information bits in a photographic emulsion in the form of images of varying degrees of opacity and transmissivity.

In each of the embodiments of the present invention described, the first ceramic lattice shutter array, i.e., the ceramic lattice shutter array whose image is formed on the information storage medium, may be incorporated, for maximum efficiency, in a focal plane shutter system as set forth in my U.S. Pat. Application Ser. No. 703,646, filed on Feb. 7, 1968 and entitled "Focal Plane Shutter System." Thus, the first ceramic lattice shutter array would be flanked on adjacent sides by lens mosaics, being positioned in the focal plane of the lens mosaics as described therein. Light from the light source may be directed through a field lens onto the focal plane shutter system.

While only certain embodiments of the present invention have been shown and described, other adaptations and modifications would be apparent without departing from the true spirit and scope of the following claims.

I claim:

1. An optical information storage and retrieval device comprising: a light source; a first ceramic lattice shutter array spaced from said light source and comprised of a plate of ferroelectric ceramic material having an anistropic optical response when polarized and a plurality of electrodes across the plate for externally applying polarizing electric fields to localized portions of the plate; a lens system comprising a plurality of lenses in a plane spaced from said first ceramic lattice shutter array and adapted to form a plurality of images of the first ceramic lattice shutter array in a plane spaced from the lenses in the lens system; a light sensitive information storage medium positioned in the image plane of the lenses in the lens system; said light sensitive information storage medium being pre-exposed to light passed through the lens system to thereby store information thereon in the form of images of the first ceramic lattice shutter array on nonoverlapping portions of the information storage medium corresponding to the lenses of the lens system; a second ceramic lattice shutter array comprised of a plate of ferroelectric ceramic material having anisotropic optical response when polarized and a plurality of electrodes across the plate for externally applying electrical polarizing fields to localized regions of the second plate, said second ceramic lattice being spaced from the information storage medium on the side opposite the lens system; control means for electrically controlling the externally applied polarizing fields at the electrodes across the first and second ceramic lattice shutter arrays; and photosensitive transducer means spaced from said second ceramic lattice shutter array whereby light from said light source transmitted through the first ceramic lattice shutter array, pre-exposed light sensitive information storage medium, and second ceramic lattice shutter array produces a signal at the output of transducer means.

2. An optical information storage and retrieval device comprising: a light source; a first ceramic lattice shutter array comprised of a plate of ferroelectric ceramic material having an anisotropic optical response when polarized and a plurality of electrodes across the plate for applying electrical polarizing fields to localized portions of the plate; a lens mosaic spaced from said ceramic lattice shutter array comprised of a multitude of lenses in a closely packed array comprised of a multitude of lenses in a closely packed array molded on a lens material of sufficient thickness so that the focal plane of the lenses comprising the lens mosaic falls on the back surface of the lens mosaic; a light sensitive information storage medium adhered to the back surface of said lens mosaic said light sensitive information storage medium being pre-exposed to light passed through the lens mosaic to store information thereon in the form of images of the first ceramic lattice shutter array on nonoverlapping portions of the information storage medium corresponding to the lenses of the lens mosaic; a second ceramic lattice shutter array positioned adjacent the back surface of said lens mosaic and adhered information storage medium; control means for controlling the electrical polarizing fields applied to the electrodes across the first and second ceramic lattice shutter arrays; and a photosensitive transducer spaced from said light sensitive information storage medium whereby light transmitted through said ceramic lattice shutter array, lens mosaic, light sensitive information storage medium, and second ceramic lattice shutter array strikes said photosensitive transducer to produce a signal at the output of the transducer.